(12) United States Patent
     Sundqvist (10) Patent No.: US 11,691,535 B2
(45) Date of Patent: Jul. 4, 2023

(54) METHOD FOR IMPROVING LIFE SPAN OF A BATTERY

(71) Applicant: CTEK Sweden AB, Vikmanshyttan (SE)

(72) Inventor: Daniel Sundqvist, Uppsala (SE)

(73) Assignee: CTEK SWEDEN AB, Vikmanshyttan (SE)

( * ) Notice: Subject to any disclaimer, the term of this patent is extended or adjusted under 35 U.S.C. 154(b) by 270 days.

(21) Appl. No.: 17/223,182

(22) Filed: Apr. 6, 2021

(65) Prior Publication Data

US 2021/0316634 A1 Oct. 14, 2021

(30) Foreign Application Priority Data

Apr. 9, 2020 (SE) .................................... 2050407-2

(51) Int. Cl.
    *B60L 58/12* (2019.01)
    *B60L 53/62* (2019.01)
    *H02J 7/00* (2006.01)

(52) U.S. Cl.
    CPC .............. *B60L 58/12* (2019.02); *B60L 53/62* (2019.02); *H02J 7/0048* (2020.01)

(58) Field of Classification Search
    CPC .... B60L 58/12; B60L 53/62; B60L 2240/547; B60L 2240/549; B60L 58/13; H02J 7/0048; H02J 7/00712; H02J 7/0071; H02J 7/007; H02J 7/00714; H02J 7/007182; Y02E 60/10; Y02T 10/70; Y02T 10/7072; Y02T 90/12; H01M 10/44; G01R 31/36
    USPC ......................................................... 320/109
    See application file for complete search history.

(56) References Cited

U.S. PATENT DOCUMENTS

| 5,710,506 A | 1/1998 | Broell et al. |
| 9,908,420 B2 | 3/2018 | Hyo et al. |
| 2010/0033124 A1 | 2/2010 | Sau et al. |
| 2011/0140672 A1 | 6/2011 | Bourbeau et al. |
| 2014/0084851 A1 | 3/2014 | Kyu-Ha et al. |
| 2015/0352966 A1 | 12/2015 | Bruno et al. |
| 2018/0257457 A1 | 9/2018 | Olson et al. |

(Continued)

FOREIGN PATENT DOCUMENTS

TW          I643376 B    12/2018

OTHER PUBLICATIONS

Swedish Search Report for Sweden Patent Application No. 2050407-2, dated Nov. 24, 2020.

*Primary Examiner* — Paul Dinh
(74) *Attorney, Agent, or Firm* — Renner, Otto, Boisselle & Sklar, LLP (57) ABSTRACT

The present disclosure relates to a method performed by battery charger configured to charge a vehicle battery, the method comprising initiating, at a first point in time (t_Bulk_Start), charging of the battery in a bulk charging mode, determining, at a second point in time (t_Bulk_End) subsequent to the first point in time (t_Bulk_Start), that the charging of the battery in the bulk charging mode is completed, estimating, at the second point in time (t_Bulk_End), a state of charge of the battery at the first point in time (t_Bulk_Start) when the charging of the battery in a bulk charging mode was initiated, initiating charging of the battery in a subsequent charging mode using the estimated state of charge (SoC_Bulk_Start), wherein the subsequent charging mode is selected from an absorption charging mode and a float charging mode.

11 Claims, 8 Drawing Sheets

(56) References Cited

U.S. PATENT DOCUMENTS

2018/0284194 A1   10/2018   Andersson
2019/0324088 A1   10/2019   Andersson
2020/0044294 A1    2/2020   Clarke et al.
2020/0052501 A1    2/2020   Liang et al.
2022/0089054 A1*  3/2022   Harshe ................... B60L 58/12

* cited by examiner

Step 710: initiating, at a first point in time, charging of the battery in a bulk charging mode.

Step 720: determining, at or close to a second point in time subsequent to the first point in time, that the charging of the battery in the bulk charging mode is completed.

Step 730: estimating, at or close to the second point in time, a state of charge of the battery at the first point in time when the charging of the battery in a bulk charging mode was initiated.

Step 740: initiating charging of the battery in a subsequent charging mode using the estimated state of charge, wherein the subsequent charging mode is selected from an absorption charging mode and a float charging mode.

METHOD FOR IMPROVING LIFE SPAN OF A BATTERY

This application claims priority of Swedish Application No. 2050407-2 filed Apr. 9, 2020, which is hereby incorporated herein by reference.

The present invention relates to a method performed by a battery charger configured to charge a battery of a vehicle. In particular, a battery charger configured to charge a starter battery of a vehicle.

BACKGROUND

Vehicles using combustion drive generally includes a starter battery for cranking and starting the engine, typically lead-acid based starter batteries. The vehicles may further comprise one or more service batteries to support various accessories for providing services.

Many utility vehicles, such as fire trucks, bus, ambulances etc., are provided with such additional accessories that provide a constant load to the starter and/or service battery. Such accessories may e.g. be on-board chargers for portable equipment, interior lighting or climate control appliances. Due to this constant load, charging of the battery is generally initiated whenever the vehicle is parked up at its home location, typically in a garage or a fire house.

Initiating charging of the battery, when using a smart charger, typically involves restarting a sequence of charging modes, such as bulk charging mode, absorption charging mode and float charging mode.

The bulk charging mode typically involves providing a maximum charging current and/or a constant current to the battery. The bulk charging mode is typically terminated when the battery voltage has reached a limit voltage and/or a limit time, at which point the state of charge is approximately at 80%.

The subsequent absorption charging mode, or constant voltage mode, typically applies a constant charging voltage and a dropping charging current for a certain period of time or a limited current.

Once the battery has reached a second and higher state of charge, e.g. 96-98%, the float charging mode is typically entered. In the float charging mode, the voltage will taper down and maintain at a steady voltage.

A drawback with such conventional battery chargers for vehicles is that for utility vehicles where charging is frequently initiated, e.g. several times a day, is that the starter battery is frequently subjected to the absorption charging mode or constant voltage charging mode. This reduces the life span of the battery due to the battery being subjected to prolonged periods of high charging voltage levels, which may e.g. lead to unnecessary water losses in the battery.

Thus, there is a need for an improved method of charging a vehicle battery.

OBJECTS OF THE INVENTION

An objective of embodiments of the present invention is to provide a solution which mitigates or solves the drawbacks described above.

SUMMARY

The above objective is achieved by the subject matter described herein. Further advantageous implementation forms of the invention are described herein.

According to a first aspect of the invention the objects of the invention is achieved by a method performed by battery charger configured to charge a vehicle battery, the method comprising initiating, at a first point in time, charging of the battery in a bulk charging mode, determining, at a second point in time subsequent to the first point in time, that the charging of the battery in the bulk charging mode is completed, estimating, at the second point in time, a state of charge of the battery at the first point in time when the charging of the battery in a bulk charging mode was initiated, initiating charging of the battery in a subsequent charging mode using the estimated state of charge, wherein the subsequent charging mode is selected from an absorption charging mode and a float charging mode.

The advantage of this first aspect includes at least an improved expected life span of the vehicle battery being charged. In particular, when used in the application for utility vehicles.

According to a second aspect of the invention the objects of the invention is achieved by a battery charger configured to charge a vehicle battery, the charger comprising a processor, and a memory, said memory containing instructions executable by said processor, whereby said charger is operative and/or configured to perform the method according to the first aspect.

According to a third aspect of the invention the objects of the invention is achieved by a computer program comprising computer-executable instructions for causing a battery charger when the computer-executable instructions are executed on a processing circuit comprised in the battery charger, to perform the method according to the first aspect.

According to a fourth aspect of the invention the objects of the invention is achieved by a computer program product comprising a computer-readable storage medium, the computer-readable storage medium having the computer program according to the third aspect embodied therein.

The advantages of the second to fourth aspects are at least the same as for the first aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

The present disclosure relates to battery chargers for vehicles, and in particular battery chargers for the application where starter batteries and/or service batteries of utility vehicles are charged. A typical property for such applications is that charging is frequently initiated, e.g. several times a day. This is due to the fact that utility vehicles are frequently provided with accessories presenting a load to service and/or starter batteries in the vehicle, and thus draining the battery over time. Such accessories may e.g. be on-board chargers for portable equipment such as flashlights, interior lighting or climate control appliances.

In a typical scenario, a utility vehicle such as a fire truck may be called out for multiple assignments during a day and will typically be re-connected to a battery charger directly after returning to the fire house. Thus, in the case of smart charger operating in subsequent charging modes such as bulk-absorption-float charging modes, the vehicle battery/batteries are frequently subjected to the absorption charging mode which reduces the life span of the battery.

The present disclosure solves this by estimating and considering, at the end of a bulk charging phase, the state of charge of the battery at the beginning of the bulk charging phase when charging was initiated. Based on this information, a decision is made whether an absorption charging mode should be entered, of if the charging should proceed to a float charging mode directly.

In other words, the presently disclosed method makes a tradeoff between total charging time required and improving the life span of the battery. If the battery was in a relatively high level of state of charge when charging was initiated, the charging proceeds to float charging mode directly without subjecting the battery to the relatively high charging voltage used when charging the battery in absorption charging mode. If the battery was in a relatively low level of state of charge when charging was initiated, the charging proceeds to absorption charging mode before entering the float charging mode.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features, and advantages of the enclosed embodiments will be apparent from the following description.

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The term "battery charger" used herein denotes a smart battery charger controlled by software and configured to be operating in subsequent charging modes, such as bulk-absorption-float charging modes. The battery charger comprises a processor and/or processing circuitry controlled by the software and controls the behavior of the charger, in particular voltage and current output to the battery.

The term "battery" or "vehicle battery" used herein denotes batteries adapted to be comprised in a vehicle and used as a service battery and/or a starter battery of the vehicle. It is understood that such batteries can be used in other applications without diverting from the present disclosure.

The term "State Of Charge", or SoC, used herein denotes a capacity/charging state of a battery related to a maximum and/or nominal capacity/charging state of the battery, and are generally given as a percentage value of the maximum capacity of the battery. E.g. SoC=0% signifies an empty battery and SoC=100% signifies a fully charged battery, capable of providing the maximum capacity of the battery.

The term "charging mode", used herein denotes a behavior of the smart battery charger, in particular with regards to charging voltage and charging current output.

The term "bulk charging mode" or "bulk charging", used herein denotes a behavior of the charger. The bulk charging mode may also be referred to as constant current charging mode, as the battery charging current is kept at a substantially constant value.

The term "absorption charging mode" or "absorption charging", used herein denotes a behavior of the charger. The absorption charging mode may also be referred to as constant voltage charging mode, as the battery charging voltage is kept at a substantially constant value.

The term "float charging mode" or "float charging", used herein denotes a behavior of the charger. The float charging mode may also be referred to as maintenance charging mode, as the battery charging voltage is kept at a substantially constant value, close to a nominal open circuit voltage and lower than in the absorption charging mode. The float charging mode is mainly aimed for top-up of the battery capacity to 100% and for compensating for self-discharge of the battery.

Figure 1:
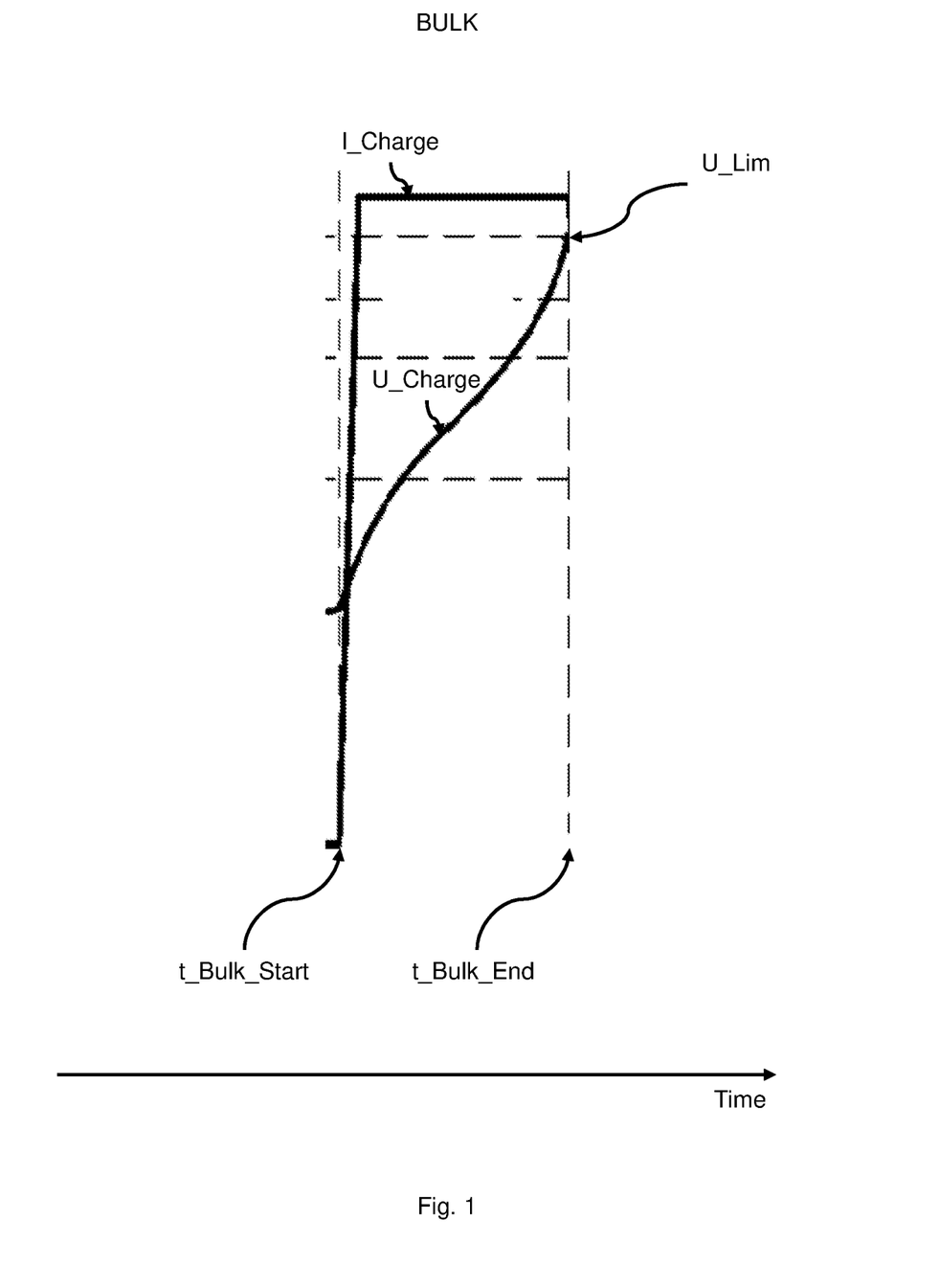
FIG. 1 illustrates behavior of the battery charger operating in bulk charging mode according to one or more embodiments of the present disclosure.

FIG. 1 illustrates behavior of the battery charger operating in bulk charging mode according to one or more embodiments of the present disclosure. FIG. 1 illustrates charging voltage and charging current output from the battery charger operating in the bulk charging mode, illustrated by the curves U_Charge for charging voltage and I_Charge for charging current respectively. At a first point in time t_Bulk_Start, charging in the bulk charging mode is initiated. The charging current is controlled and/or ramped up from substantially zero (0) Ampere to a target constant charging current I_Charge Ampere. At a second point in time t_Bulk_End, it is determined that charging in the bulk charging mode is completed, e.g. by determining that a first measured voltage over the poles of the battery is equal to or exceeds a voltage threshold U_Lim.

In one example, the battery charger is connected to two serially connected 12 V Lead-Acid batteries forming a 24 V battery pack. The battery voltage when bulk charging is initiated is 23.2 Volts. At the first point in time t_Bulk_Start, a constant charging current of 10 Ampere is provided to the battery pack, i.e. I_Charge=10 A. As can be seen in FIG. 1, the battery voltage steadily increases until it reaches the voltage threshold U_Lim=28.8 Volt at the second point in time t_Bulk_End. From historical observations of battery charging curves, this implies that the State of Charge SoC has reached 80% at the second point in time t_Bulk_End. In other words, predetermined data indicates that when the voltage threshold U_Lim reaches 28.8 Volt, the battery pack as a SoC of 80%.

Figure 2:
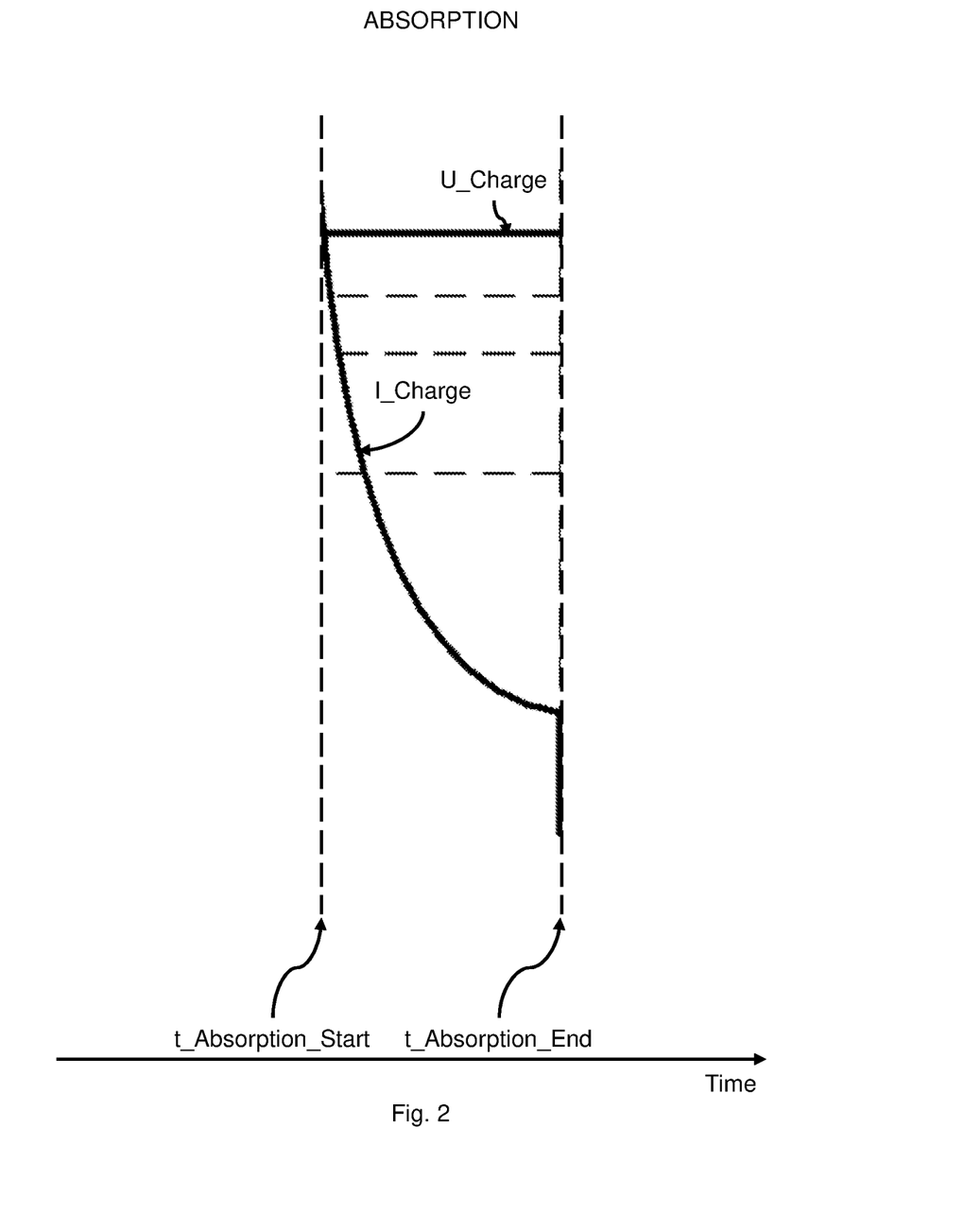
FIG. 2 illustrates behavior of the battery charger operating in absorption charging mode according to one or more embodiments of the present disclosure.

FIG. 2 illustrates behavior of the battery charger operating in absorption charging mode or constant voltage charging mode according to one or more embodiments of the present disclosure. FIG. 2 illustrates charging voltage and charging current output from the battery charger operating in the absorption charging mode, illustrated by the curves U_Charge and I_Charge respectively. At a third point in time t_Absorption_Start, charging in the absorption mode is initiated. The charging voltage is then controlled to or kept at a substantially constant voltage, e.g. at the voltage threshold U_Lim as described in relation to FIG. 1. The charging current drops or is reduced over time, e.g. from the constant charging current I_Charge Ampere described in relation to FIG. 1. The charging voltage is maintained for a predetermined period of time until a fourth point in time t_Absorption_End. The predetermined period of time may be given by a relation, e.g. a lookup table, relating the constant charging current used in the bulk charging mode I_Charge to a period of time. Examples of such period of time is 8 hours for a charging current of 20 Ampere, 6 hours for a charging current of 10 Ampere and 5 hours for a charging current of 8 Ampere.

Figure 3:
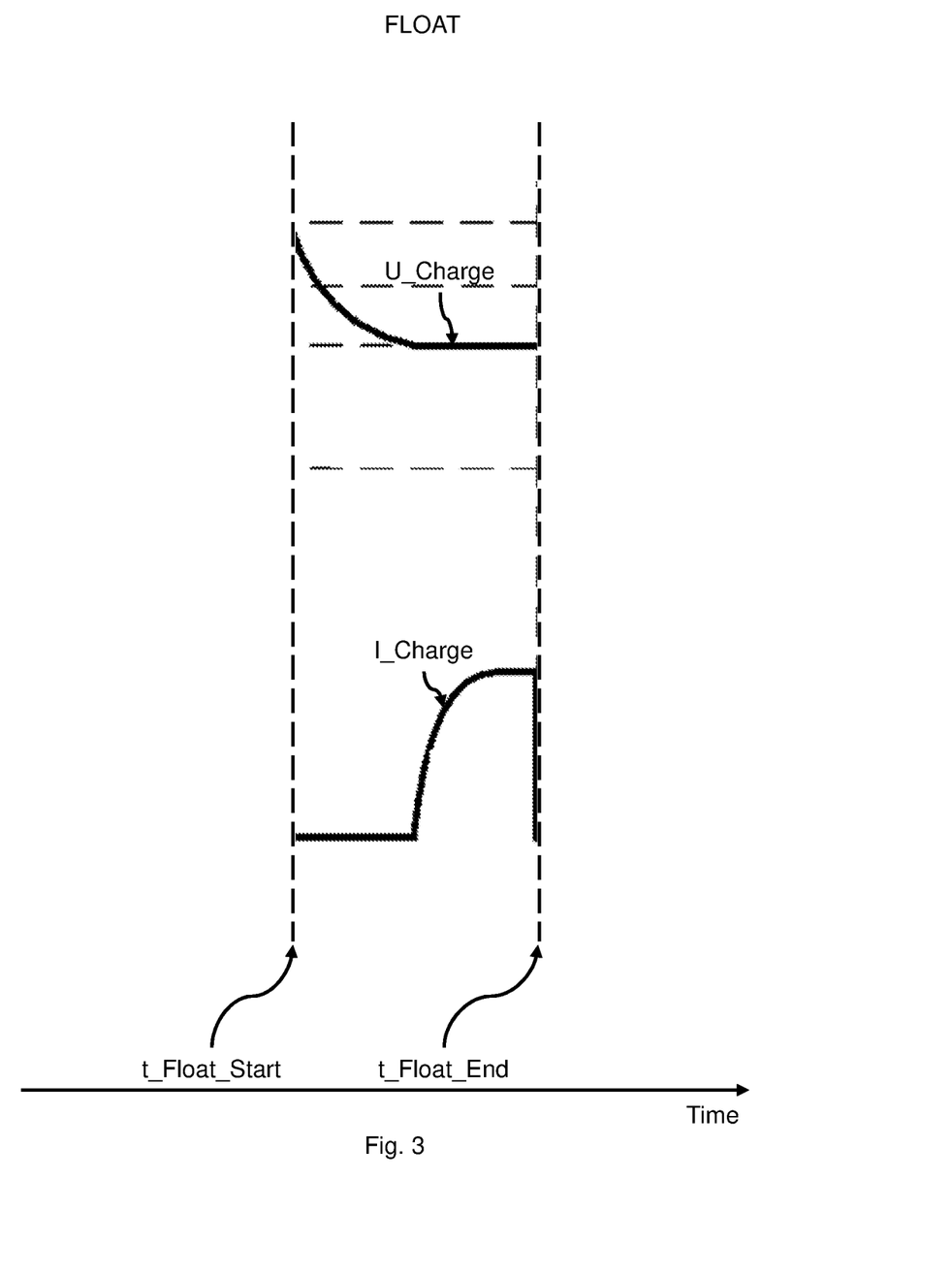
FIG. 3 illustrates behavior of the battery charger operating in float charging mode according to one or more embodiments of the present disclosure.

FIG. 3 illustrates behavior of the battery charger operating in float charging mode according to one or more embodiments of the present disclosure. FIG. 3 illustrates charging voltage and charging current output from the battery charger operating in the float charging mode, illustrated by the curves U_Charge and I_Charge respectively. At a fifth point in time t_Float_Start, charging in the float mode is initiated. The charging voltage is then controlled to or kept at a substantially constant voltage, e.g. at a voltage close to a nominal open circuit voltage and lower than the constant voltage used the absorption charging mode, e.g. lower than U_Lim as further described in relation to FIG. 1 and FIG. 2. The charging current is limited to a predetermined current equal to an expected self-discharge current and a standby current. The constant charging voltage is maintained for a predetermined period of time until a sixth point in time t_Float_End. The predetermined period of time may be limited to a maximum of 10 days or 240 hours.

In one example, the float charging mode has been preceded by an absorption charging mode, where the charging voltage has been controlled to or kept at a substantially constant voltage, e.g. at the voltage threshold U_Lim as described in relation to FIG. 1. E.g. at U_Lim=28.8 Volt. The charging voltage is then allowed to smoothly drop down close to a nominal open circuit voltage, e.g. 27.2 Volt, which is then kept constant for the duration of the float charge mode.

Figure 4A:
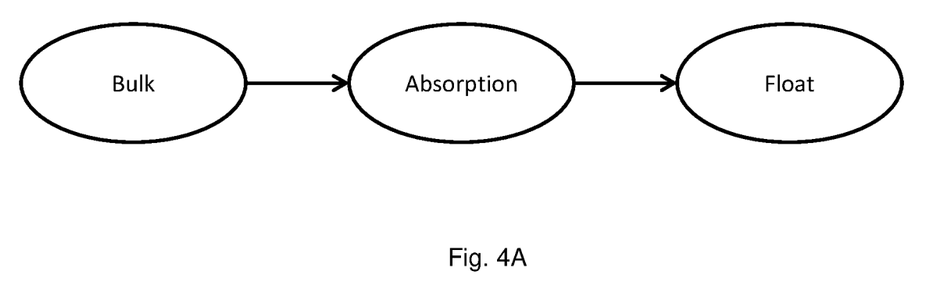
FIG. 4A illustrates behavior of a conventional battery charger.

FIG. 4A illustrates behavior of a conventional battery charger. FIG. 4 illustrates different charging modes that the battery charger or smart battery charger subsequently operate in. In other words, the charger initially operates in a bulk charging mode, then subsequently switches to operate in an absorption charging mode and subsequently to that switches to operate in a float charging mode. A smart battery charger typically comprises a processor and/or processing circuitry controlled by software and controls the behavior of the charger, in particular with regards to charging voltage and charging current output.

A drawback with such conventional smart battery chargers for vehicles is that for use cases involving charging batteries of utility vehicles where charging is frequently initiated, e.g. several times a day, is that battery/batteries is/are frequently subjected to the absorption charging mode which reduces the life span of the battery due to prolonged periods of high charging voltage levels, which e.g. may lead to unnecessary water loss in the battery.

Figure 4B:
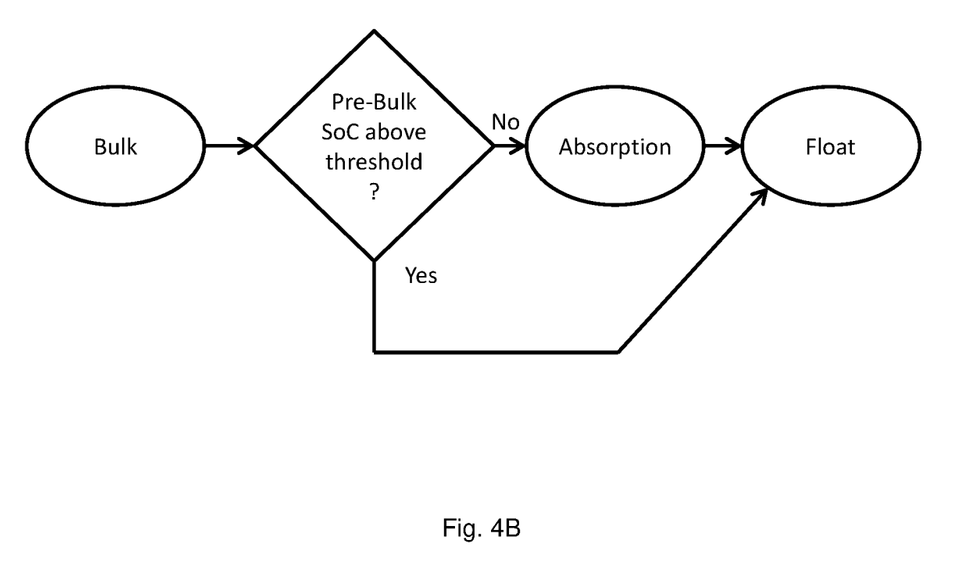
FIG. 4B illustrates behavior of a battery charger according to one or more embodiments of the present disclosure.

FIG. 4B illustrates behavior of a battery charger according to one or more embodiments of the present disclosure. As can be seen from FIG. 4B, once the bulk charging mode is completed at the second point in time t_Bulk_End, a state of charge of the battery is determined or estimated for the first point in time t_Bulk_Start, when the charging of the battery in the bulk charging mode was initiated.

In other words, once the bulk charging mode is completed at the second point in time t_Bulk_End, it is known that the state of charge of the battery will be at 80%. This may e.g. be known by studying predetermined data, such as historic charging curves when charging batteries of a similar type. By estimating the state of charge of the battery when the bulk charging mode was initiated, i.e. at the first point in time t_Bulk_Start, it may be determined if the estimated state of charge was relatively low or relatively high. In other words, it can be determined if the battery was in a relatively high level of state of charge when bulk charging was initiated or if the battery was in a relatively low level of state of charge when bulk charging was initiated.

In one example, a relatively high level of state of charge could be seen as SoC at 75% or more and a relatively low level of state of charge could be seen as SoC below 75%. I.e. a SoC threshold of 75% can be used to classify the level of state of charge when bulk charging was initiated. Any other suitable SoC threshold may be used to differentiate between a relatively high level of SoC and a relatively low level of SoC.

Based on the information that the battery was in a relatively high level of SoC or that the battery was in a relatively low level of SoC, a decision can then be made whether the battery charger should subsequently operate in an absorption charging mode when a relatively low level of state of charge is determined, of if the battery charger should subsequently operate in a float charging mode when relatively high level of state of charge is determined.

In other words, the presently disclosed method and battery charger makes a tradeoff between total charging time required and improving the life span of the battery. If the battery was in a relatively high level of state of charge when charging was initiated, the charging proceeds to float charging mode directly without subjecting the battery to the relatively high charging currents used when charging the battery in absorption charging mode.

This has the advantage of extending the operational lifespan of the battery.

Figure 5:
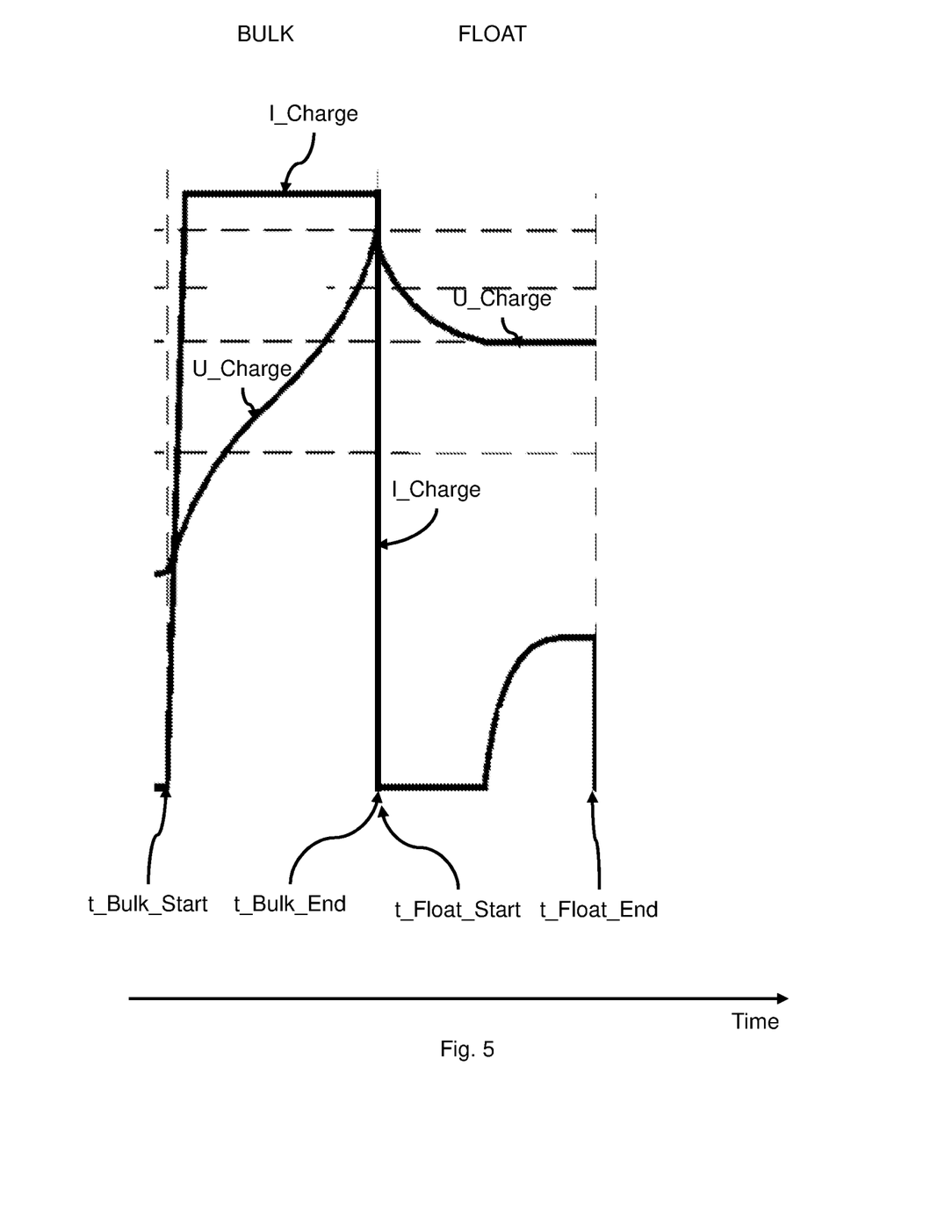
FIG. 5 exemplifies the behavior of a battery charger at a relatively high level of state of charge according to one or more embodiments of the present disclosure.

FIG. 5 exemplifies the behavior of the battery charger at a relatively high level of state of charge according to one or more embodiments of the present disclosure.

With reference to FIG. 1, FIG. 3 and FIG. 4B, the battery charger ends operation in the bulk charging mode at the second point in time t_Bulk_End. The state of charge of the battery is then estimated or determined for the first point in time t_Bulk_Start, when the charging of the battery in the bulk charging mode was initiated. In the example in FIG. 5, it is then determined that the state of charge for the first point in time t_Bulk_Start is equal to or above a SoC threshold, e.g. of 75%, and thus is considered as a relatively high level of state of charge. The battery charger then selects to and/or is controlled to operate in a float charging mode as the subsequent charging mode. The subsequent charging mode is selected from the absorption charging mode and the float charging mode.

Figure 6:
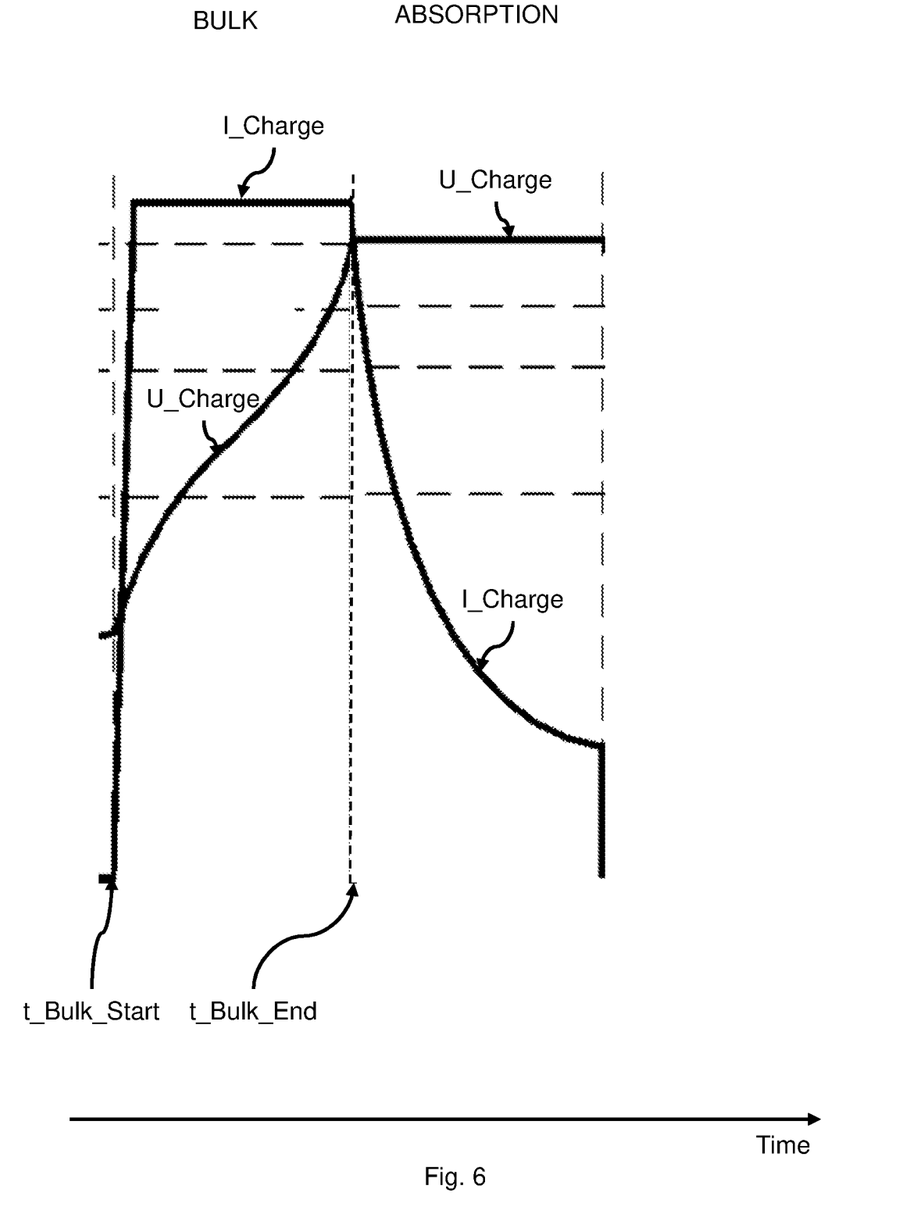
FIG. 6 exemplifies the behavior of a battery charger at a relatively low level of state of charge according to one or more embodiments of the present disclosure.

FIG. 6 exemplifies the behavior of the battery charger at a relatively low level of state of charge according to one or more embodiments of the present disclosure. With reference to FIG. 1, FIG. 3 and FIG. 4B, the battery charger ends operation in the bulk charging mode at the second point in time t_Bulk_End. The state of charge of the battery is then estimated or determined for the first point in time t_Bulk_Start, when the charging of the battery in the bulk charging mode was initiated. In the example in FIG. 6, it is then determined that the state of charge for the first point in time t_Bulk_Start is below a SoC threshold, e.g. of 75%, and thus is considered as a relatively low level of state of charge. The battery charger then selects and/or is controlled to operate in an absorption charging mode as the subsequent charging mode. The subsequent charging mode is selected from the absorption charging mode and the float charging mode.

It is understood that the battery charger may subsequently operate in further charging modes, such as the float charging mode, after the absorption charging mode is completed.

Figure 7:
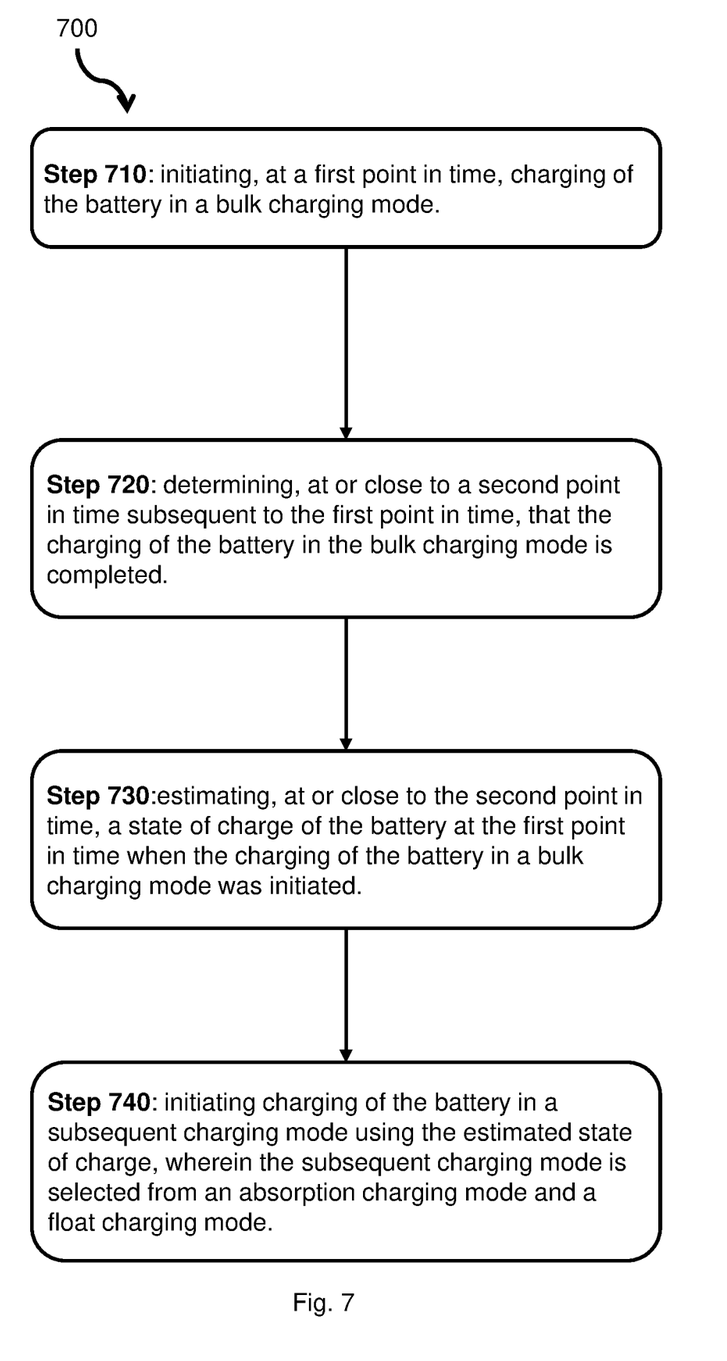
FIG. 7 shows a flowchart of a method according to one or more embodiments of the present disclosure.

FIG. 7 shows a flowchart of a method according to one or more embodiments of the present disclosure. The method is performed by battery charger configured to charge a vehicle battery. The battery charger is further described in relation to FIG. 8. The method comprises:

Step 710: initiating, at a first point in time t_Bulk_Start, charging of the battery in a bulk charging mode. It is understood that the bulk charging mode may be preceded by one or more other charging modes, such as a battery testing mode, a soft charge mode and a de-sulphatization mode.

In other words, constant current charging mode is initiated.

Step 720: determining, at or close to a second point in time t_Bulk_End subsequent to the first point in time t_Bulk_Start, that the charging of the battery in the bulk charging mode is completed.

In one embodiment, the bulk charging mode is determined to be completed when a first measured voltage over poles of the battery is equal to or exceeds a voltage threshold U_Lim.

In one example, the voltage threshold U_Lim is set to 28.8 Volts other examples threshold could be 29.4 Volts or 14.4 and 14.7 Volts.

Step 730: estimating, at or close succession to the second point in time t_Bulk_End, a state of charge of the battery at the first point in time t_Bulk_Start when the charging of the battery in a bulk charging mode was initiated.

In other words, estimating SoC at the time when bulk charging was initiated enables later determination if battery was in a relatively high level of SoC when bulk charging was initiated or if battery was in a relatively low level of SoC when bulk charging was initiated.

In a first embodiment the state of charge SoC_Bulk_Start is estimated using a first relation at least dependent on time.

In other words, the time difference between first point in time t_Bulk_Start and the second point in time t_Bulk_End is used to select the subsequent charging mode of the battery charger. In this embodiment, the first relation is dependent on a selection of any of a predetermined state of charge SoC_Bulk_End, a predetermined charging current I_Charge used in the bulk charging mode, a nominal capacity of the battery CAP_Battery, and a difference between the first point in time and the second point in time $\Delta t$.

In one example, the predetermined state of charge SoC_Bulk_End is 80%. The predetermined charging current I_Charge is obtained/retrieved as a parameter stored in memory of the battery charger. The nominal capacity of the battery CAP_Battery is obtained/retrieved as a parameter stored in memory of the battery charger and/or is obtained by performing measurements on the battery, e.g. as further described in Swedish patents SE 540542 and S541171 hereby included by reference.

Additionally and/or alternatively the state of charge SoC_Bulk_Start is estimated using the relation SoC_Bulk_Start=SoC_Bulk_End$-((\Delta t*I\_Charge)/$CAP_Battery), wherein SoC_Bulk_Start is the estimated state of charge, SoC_Bulk_End is the predetermined state of charge, $\Delta t$ is the time difference between the first point in time and the second point in time, I_Charge is the charging current used in the bulk charging mode and CAP_Battery is the nominal capacity of the battery.

Additionally and/or alternatively the predetermined state of charge SoC_Bulk_End is derived from a charging curve associated to the battery, e.g. 80% SoC. In other words the SoC at the second point in time t_Bulk_End.

In a further embodiment, the state of charge SoC_Bulk_Start is estimated using charging current integration methods, i.e. "coulomb counting", where SoC is calculated by measuring the charging current and integrating it in time. E.g. between the first point in time t_Bulk_Start and the second point in time t_Bulk_End.

In other words, a relative SoC change occurring between the first point in time t_Bulk_Start and the second point in time t_Bulk_End can be estimated, and the state of charge SoC_Bulk_Start is estimated by deducting the relative SoC change from the known SoC of 80% at the second point in time t_Bulk_End.

In a further embodiment, the state of charge SoC_Bulk_Start is estimated using open circuit voltage, OCV, of the battery and using it to estimate the SoC using predetermined data, such as a lookup table. In this embodiment, the state of charge SoC_Bulk_Start is estimated by measuring, at the first point in time t_Bulk_Start, an open circuit voltage, OCV, of the battery, and estimating the state of charge SoC_Bulk_Start using a predetermined relation and the measured OCV. Optionally, the OCV may be obtained as a rested OCV value by obtaining the OCV value after the battery has been allowed to rest, e.g. after a few hours up to 24 hours.

In one example, a predetermined lookup table is provided for mapping the OCV to SoC. The predetermined lookup table may e.g. be obtained by studying historical charging of batteries such as historic charging curves obtained when charging batteries of a similar type.

On one further embodiment, the state of charge SoC_Bulk_Start is estimated using trends of measured battery voltage or voltage over the poles of the battery. In this embodiment, the state of charge SoC_Bulk_Start is estimated by measuring, at multiple points in time subsequent to the first point in time t_Bulk_Start, a plurality of battery voltage values. Further, a voltage trend is determined over time using the plurality of measured battery voltage values.

The charging current I_Charge is then estimated based on a second relation, where the second relation is dependent on the voltage trend over time and a predetermined state of charge SoC_Bulk_End at the second point in time t_Bulk_End.

This embodiment is further described in Swedish patents SE540603 and SE540073, hereby included by reference.

Step 740: initiating charging of the battery in a subsequent charging mode using the estimated state of charge SoC_Bulk_Start, wherein the subsequent charging mode is selected from an absorption charging mode and a float charging mode.

In one embodiment, initiating charging of the battery in a subsequent charging mode comprises initiating charging of the battery in an absorption charging mode after the bulk charging mode if the estimated state of charge SoC_Bulk_Start is less than a state of charge threshold SoC_Lim, or initiating charging of the battery in a float charging mode after the bulk charging mode if the estimated state of charge SoC_Bulk_Start is equal to or greater than the state of charge threshold SoC_Lim. In one example, the state of charge threshold SoC_Lim is set to 75%.

In other words, if the estimated state of charge SoC_Bulk_Start is determined to be equal to or greater than the state of charge threshold SoC_Lim it is determined that the estimated state of charge SoC_Bulk_Start was relatively high. If the estimated state of charge SoC_Bulk_Start is determined to be less than the state of charge threshold SoC_Lim it is determined that the estimated state of charge SoC_Bulk_Start was relatively low.

Figure 8:
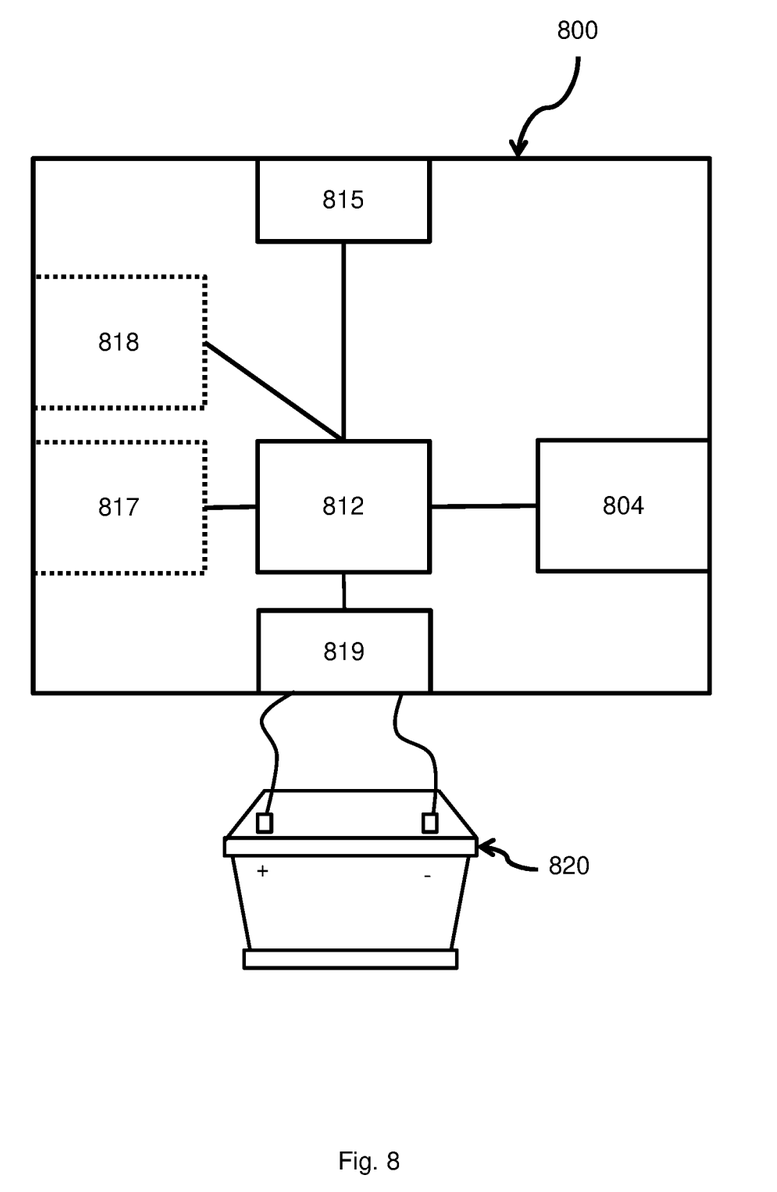
FIG. 8 shows a battery charger according to one or more embodiments of the present disclosure.

In one embodiment, a computer program is provided and comprising computer-executable instructions for causing the battery charger 800 when the computer-executable instructions are executed on a processor and/or processing circuit/circuitry comprised in the battery charger 800, to perform any of the method steps described herein.

In one embodiment, a computer program product is provided and comprising a computer-readable storage medium, the computer-readable storage medium having the computer program above embodied therein.

FIG. 8 shows the battery charger 800 according to one or more embodiments of the present disclosure. The battery charger 800 may be in the form of e.g. an Electronic Battery charger, a server, an on-board computer, a stationary computing device, a laptop computer, a tablet computer, a handheld computer, a wrist-worn computer, a smart watch, a smartphone or a smart TV. The battery charger 800 may comprise a processor/processing circuitry 812 communicatively coupled to a communications interface 804, e.g. a transceiver configured for wired or wireless communication. The battery charger 800 may further comprise at least one optional antenna (not shown in figure). The antenna may be coupled to the transceiver and is configured to transmit and/or emit and/or receive wired or wireless signals in a communication network, such as WiFi, Bluetooth, 3G, 4G, 5G etc.

In one example, the processing circuitry 812 may be any of a selection of processing circuitry and/or a central processing unit and/or processor modules and/or multiple processors configured to cooperate with each-other.

Further, the battery charger 800 may further comprise a memory 815. The memory 815 may e.g. comprise a selection of a hard RAM, disk drive, a floppy disk drive, a flash drive or other removable or fixed media drive or any other suitable memory known in the art. The memory 815 may contain instructions executable by the processing circuitry to perform any of the steps or methods described herein.

The processing circuitry 812 may optionally be communicatively coupled to a selection of any of the communications interface 804, the memory 815, one or more sensors, such as battery voltage sensors measuring battery voltage over poles of the battery. The battery charger 800 may be configured to send/receive control signals directly to any of the above mentioned units or to external nodes or to send/receive control signals via the wired and/or wireless communications network.

The communications interface 804, such as a wired/wireless communications network adapter and/or a wired/wireless transceiver, may be configured to send and/or receive data values or parameters as a signal to or from the processing circuitry 812 to or from other external nodes. E.g. measured battery voltage values. In an embodiment, the communications interface 804 communicates directly to external nodes or via the wireless communications network.

In one or more embodiments the battery charger 800 may further comprise an input device 817, configured to receive input or indications from a user and send a user input signal indicative of the user input or indications to the processing circuitry 812.

In one or more embodiments the battery charger 800 may further comprise a display 818 configured to receive a display signal indicative of rendered objects, such as text or graphical user input objects, from the processing circuitry 812 and to display the received signal as objects, such as text or graphical user input objects.

In one embodiment the display 818 is integrated with the user input device 817 and is configured to receive a display signal indicative of rendered objects, such as text or graphical user input objects, from the processing circuitry 812 and to display the received signal as objects, such as text or graphical user input objects, and/or configured to receive input or indications from a user and send a user-input signal indicative of the user input or indications to the processing circuitry 812.

In a further embodiment, the battery charger 800 may further comprise and/or be coupled to one or more additional sensors (not shown in the figure) configured to receive and/or obtain and/or measure physical properties pertaining to the battery and/or battery charger and send one or more sensor signals indicative of the physical properties of the battery and/or battery charger to the processing circuitry 812. E.g. an external voltage sensor measuring battery voltage and/or ambient temperature.

In a further embodiment, the battery charger 800 is configured to be communicatively and/or electrically connected to the battery 820, e.g. by battery clamps, cables and connectors. The battery charger 800 then outputs charging voltage and charging current to the battery 820 via the communicative and/or electrical connections.

In a further embodiment, the battery charger 800 comprises a controllable power source 819 configured to output charging voltage and charging current to the battery 820 based on control signals received from the processing circuitry 812. The controllable power source 819 typically provides charging voltage and charging current to the battery 820 via coupling means, e.g. via battery clamps, cables and connectors.

In one or more embodiments, the processing circuitry 812 is further communicatively coupled to the communications interface 804 and/or the input device 817 and/or the display 818 and/or the controllable power source 819 and/or the sensors and/or the additional sensors and/or any of the units described herein.

In one embodiment, a battery charger 800) is provided and is configured to charge a vehicle battery 820, the charger comprising a processor 812, and a memory 815, said memory containing instructions executable by said processor, whereby said charger 800 is operative and/or configured to perform any of the method steps described herein.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited thereto.

Moreover, it is realized by the skilled person that the battery charger 800 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processing circuitry and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processing circuitry" and/or "processing means" may thus represent a processing circuitry comprising a plurality of processing circuits, such as, e.g., any, some or all of the ones mentioned above. The processing means may further perform data processing functions for inputting, outputting, and processing of data comprising data buffering and device control functions, such as user interface control, or the like.

Finally, it should be understood that the invention is not limited to the embodiments described above, but also relates to and incorporates all embodiments within the scope of the appended independent claims.

The invention claimed is:

1. A method performed by battery charger configured to charge a vehicle battery, the method comprising:
    initiating, at a first point in time (t_Bulk_Start), charging of the battery in a bulk charging mode,
    determining, at a second point in time (t_Bulk_End) subsequent to the first point in time (t_Bulk_Start), that the charging of the battery in the bulk charging mode is completed,
    estimating, at the second point in time (t_Bulk_End), a state of charge of the battery at the first point in time (t_Bulk_Start) when the charging of the battery in a bulk charging mode was initiated,
    initiating charging of the battery in a subsequent charging mode using the estimated state of charge (SoC_Bulk_Start), wherein the subsequent charging mode is selected from an absorption charging mode and a float charging mode.

2. The method according to claim 1, wherein initiating charging of the battery in a subsequent charging mode comprises:
    initiating charging of the battery in an absorption charging mode if the estimated state of charge (SoC_Bulk_Start) is less than a state of charge threshold (SoC_Lim), or
    initiating charging of the battery in a float charging mode if the estimated state of charge (SoC_Bulk_Start) is equal to or greater than the state of charge threshold (SoC_Lim).

3. The method according to claim 1, wherein the state of charge (SoC_Bulk_Start) is estimated using a first relation at least dependent on time, wherein the first relation is dependent on a predetermined state of charge (SoC_Bulk_End), a predetermined charging current (I_Charge) used in the bulk charging mode, a nominal capacity of the battery (CAP_Battery), and a difference between the first point in time and the second point in time (Δt).

4. The method according to claim 3, wherein the wherein the state of charge (SoC_Bulk_Start) is estimated using the relation:

$$SoC\_Bulk\_Start=SoC\_Bulk\_End-((\Delta t*I\_Charge)/CAP\_Battery),$$

wherein SoC_Bulk_Start is the estimated state of charge, SoC_Bulk_End is the predetermined state of charge, Δt is the time difference between the first point in time and the second point in time, I_Charge is the charging current used in the bulk charging mode and CAP_Battery is the nominal capacity of the battery.

5. The method according to claim 3, wherein the predetermined state of charge (SoC_Bulk_End) is derived from a charging curve associated to the battery.

6. The method according to claim 1, wherein the state of charge (SoC_Bulk_Start) is estimated by:
    measuring, at the first point in time (t_Bulk_Start), an open circuit voltage, OCV, of the battery, and
    estimating the state of charge (SoC_Bulk_Start) using a predetermined relation and the measured OCV.

7. The method according to claim 1, wherein the state of charge (SoC_Bulk_Start) is estimated by:
    measuring, at multiple points in time subsequent to the first point in time (t_Bulk_Start), a plurality of battery voltage values,
    determining a voltage trend over time using the plurality of battery voltage values,
    obtaining a charging current (I_Charge) used in the bulk charging mode.

8. The method according to claim 1, wherein the bulk charging mode is determined to be completed when a first measured voltage over the poles of the battery is equal to or exceeds a voltage threshold (U_Lim).

9. A battery charger configured to charge a vehicle battery, the charger comprising:
- a processor, and
- a memory, said memory containing instructions executable by said processor, whereby said charger is operative and/or configured to perform the method according to claim 1.

10. A computer program comprising computer-executable instructions for causing a battery charger when the computer-executable instructions are executed on a processing circuit comprised in the battery charger, to perform the method according to claim 1.

11. A computer program product comprising a computer-readable storage medium, the computer-readable storage medium having the computer program according to claim 10 embodied therein.

* * * * *